Nov. 14, 1967  T. H. HAINES  3,353,076
MOTOR CONTROL CIRCUIT FOR A STEPPING MOTOR
Filed Nov. 19, 1964

THOMAS H. HAINES
INVENTOR.

BY R. Frank Smith
David P. Ogden
ATTORNEYS

United States Patent Office 3,353,076
Patented Nov. 14, 1967

3,353,076
MOTOR CONTROL CIRCUIT FOR
A STEPPING MOTOR
Thomas H. Haines, Rochester, N.Y., assignor to Eastman Kodak Company, Rochester, N.Y., a corporation of New Jersey
Filed Nov. 19, 1964, Ser. No. 412,402
7 Claims. (Cl. 318—138)

ABSTRACT OF THE DISCLOSURE

A maximum torque stepping motor providing stepping during interstep positions to develop maximum torque during each high speed step. Stepping is controlled by the mechanical position of the motor in such a way as to obtain such maximum torque without loss of synchronism with a sequence of encoded signals.

---

This invention relates generally to electric motor control circuit and more particularly to a control circuit for a stepping motor having 2 or 4 step sequence.

In stepping motors of the type considered here, there are provided field windings for shifting a magnetic field vector sequentially over a plurality such as 4 or 50 or more poles. The field vector co-operates with a permanent magnetic arrangement such that the rotor is disposed to align with one or more of the poles. Such motors have torque in accordance with the lagging or leading displacement between a permanent magnet and the field vector. Generally speaking the maximum torque is obtained when the field vector lags the magnets by one full step, with zero torque being present when the magnets and the field are in alignment or 2 steps out of alignment.

Various rather complex motor control circuits have been designed to accelerate such stepping motors. However, there has long been a need for a simple and reliable system for synchronously controlling such motors with maximum efficiency. Thus, I have found that to obtain maximum torque and acceleration, it is desirable to switch the magnetic field one step each time the rotor gets within ½ step of the current position of the field. When less than maximum torque or acceleration is necessary, the switching occurs at time intervals other than ½ step out of phase.

Therefore, an object of this invention is to provide a novel, improved motor control circuit arrangement for selectively obtaining a maximum torque and acceleration from a stepping motor.

In accordance with one embodiment of my invention, means is provided for detecting the position of an electric motor in accordance with the total number of steps in which the motor can be positioned. These position signals are in binary form being alternately light or dark (plus or minus) and indicate when the system is ready to receive another step signal. At the same time these ready signals are being developed during rotation of the motor, a series of command signals are provided to the motor to cause it to turn in a specific direction a specific number of steps. When the ready signal indicates the motor is in plus position and the next command signal calls for a minus position of the motor, the motor is in a ready condition and the signals are allowed to energize a next field element of the motor. As soon as the next field element is energized, the system awaits further signals until the detector has indicated the motor is again ready for a next signal or until the control device indicates a next signal should be applied whichever is longer. In this manner, maximum acceleration and maximum torque is obtainable without loss of synchronism.

The subject matter which is regarded as my invention is particularly pointed out and distinctly claimed in the concluding portion of this specification. The invention, however, as to its organization and operation, together with further objects and advantages, will best be understood by reference to the following description taken in connection with the accompanying drawing, in which:

Figure 1:
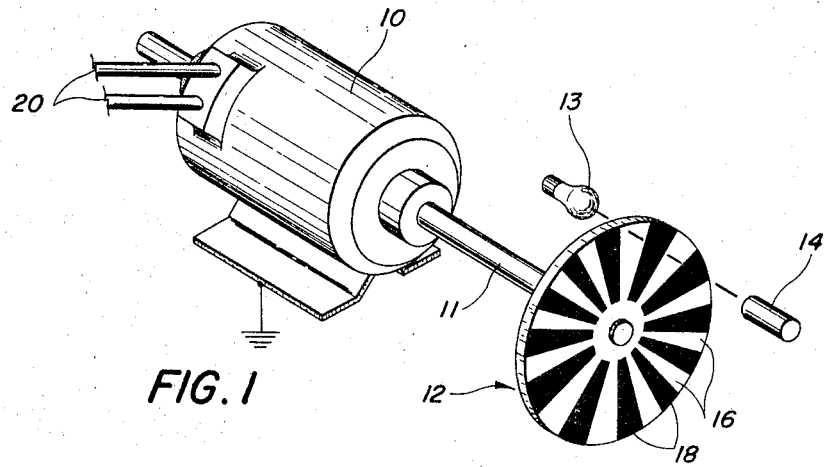
FIG. 1 is a simplified view of a stepping motor usable with my invention.

Referring now to the drawing, wherein like numbers refer to similar parts, I have shown in FIG. 1 a motor 10 having a rotor drive shaft 11 supporting a segmented disk 12 to move therewith between a detector including a lamp 13 and a photo detector device 14. Thus the detector is able to distinguish between the light segments 16 and the dark segments 18 of the disk 12 to indicate the position of the rotor shaft 11. The motor 10, being a stepping motor, is moved from one position to a next position in accordance with signals received at its power lines 20. This operation of stepping motors is well known and need not be fully described herein, except that, by proper arrangement of switch elements and the like, the motor 10 may be made to move one step clockwise or one step counterclockwise in response to each pulse applied thereto by means of power lines 20 respectively.

Figure 2:
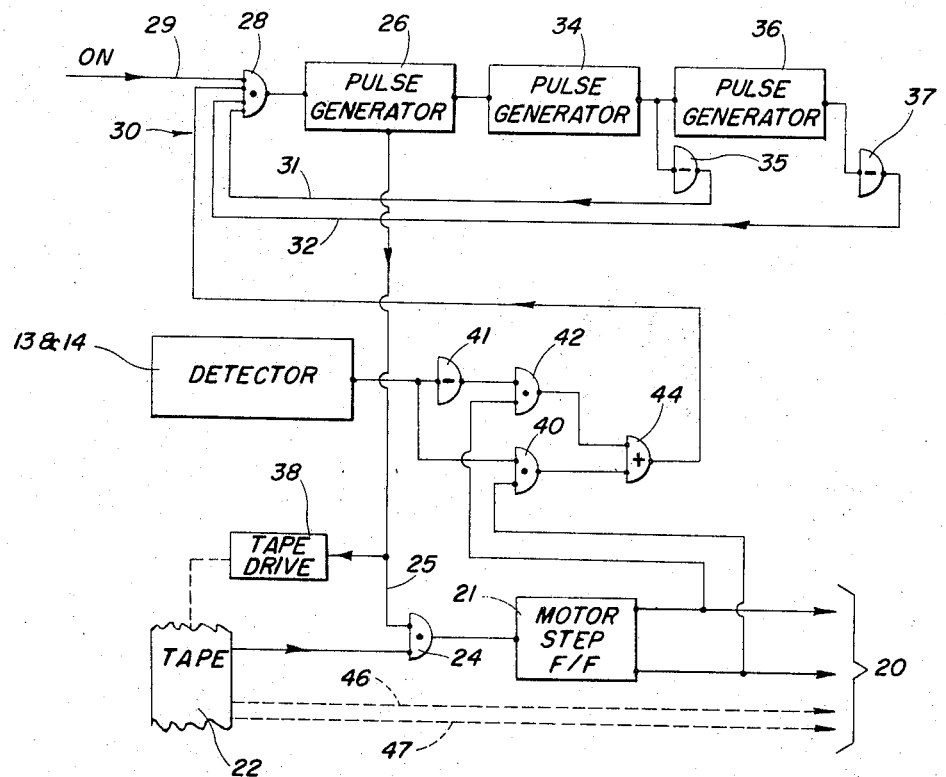
FIG. 2 is a schematic view of the control circuit using my invention.

The particular control circuit of my invention is more easily understood by reference to FIG. 2 wherein the power lines 20 are indicated as providing clockwise and counterclockwise pulses. These power lines 20 are coupled to the output of a circuit 21 known as a motor step flip-flop which in itself is a relatively conventional way to drive such stepping motors. A sequence of command signals for driving the motor 10 is derived from a program circuitry which may have as initial source of information a punched tape command signal as indicated at 22. However, in the particular environment of the present invention and many enviroments of such motors, it is a requisite that the motor 10 does not lose synchronization with the pulses punched on the tape 22. Therefore, this tape signal is applied to an "and" gate circuit 24 which passes the command stepping signal to the flip-flop 21 only when the "ready" signal is applied to this "and" gate 24 from a signal line 25.

The ready signal is developed by a pulse generator 26. However, the triggering mechanisms of the pulse generator 26 include an "and" gate circuit 28 having a plurality of inputs with a first input on line 29 being a system "on" signal and a second input on line 30 being a signal indicating that the rotor position indicator disk 12 is in a position such that the motor can logically receive a next signal. By way of example, the "on" signal could include information that the work product of the motor 10 is in location and ready to be worked on. The third and fourth signals coming to the "and" circuit 28 on lines 31 and 32 from a delay means associated with the pulse generator 26. These signals indicate that the pulse generators (34 and 35, see below) themselves are not yet in condition to receive another pulse. These signals 31 and 32 are selected to indicate that the tape 22 has had sufficient time to advance one character position. One of the delay means is a time delay device indicated by a pulse generator 34 which supplies the signal information on line 31 as a delay pulse having a duration of the order of a few milliseconds. When passed through a signal inverter circuit 35 this pulse on line 31 provides a negative or disabling signal to the "and" gate 28 until the pulse generator 34 has completed its pulse and has triggered a pulse generator 36. The pulse generator 36 provides a similar delay signal delay pulse on the line 32 of the order of a few milliseconds through an inverter circuit 37 to prevent operation of the pulse generator 26 until the tape 22 has been provided sufficient time to complete its move to a next sequential command signal position.

At the same time a ready pulse is applied through the line 25 to the input "and" gate 24, a portion of the pulse generator 26 pulse is applied to a tape drive mechanism 38 of any well-known type. For instance, Model 464 sold by Tally Register Corporation will work well here. On receipt of that signal the drive mechanism 38 rapidly advances the tape 22 to a next position to present a next series of command signals thereof. The combined delay of the pulse generators 26, 34, and 36 is arranged to allow completion of the movement of the tape 22.

The signal from the photo detector 13 and 14 is applied directly to an "and" gate circuit 40 and through inverter circuit 41, to a second "and" gate circuit 42 in accordance with the signal presently being applied to the motor 10. Thus the motor moves toward a next position without receiving a further step signal until the ready signal changes between light and dark. This ready signal, as sensed by the photo detector system will energize one of the "and" gates 40 or 42 to apply a signal through an "or" gate circuit 44 to the "and" gate 28. It will be apparent to those familiar with this art that clockwise and counterclockwise signals may be developed at the tape 22 and pass through lines 46 or 47 to control the direction of rotation of the motor 10.

Since the maximum torque of a stepping motor of this type is attainable in the region between one-half and one and one-half steps, that is, with the magnetic field vector leading the momentary position of the rotor by one step, plus or minus one-half, I have positioned the signal disc 12 to provide a change in signal between light and dark precisely midway between steps. Thus, if a next command step is present, as soon as the motor 10 is one-half step lagging the ready signal moves to one and one-half steps so that a command signal may drive the motor through its maximum torque operation. Also by positioning the disk 12 midway between steps, both clockwise and counterclockwise command signals as developed by the tape 22 will provide maximum torque. Obviously with such maximum torque operation, the motor requires a minimum acceleration period to obtain maximum speed for any given load.

While I have shown a particular embodiment of this invention, modifications thereof will occur to those skilled in this art. For instance, three step stepping motors may be operated by the principles of the present invention. I intend therefore to have the appended claims cover such embodiments as properly fall within the scope of the present invention.

I claim:
1. A stepping motor acceleration control system comprising:
   means for detecting the relative difference between the mechanical and electric and condition of such motor and for generating a position signal when such difference is one-half step;
   encoded means for generating a limited series of step signal pulses; and
   first gate circuit means for comparing the step signal pulse with the position signal and passing each step signal pulse presented by said encoded means only when the motor is no more than one and one-half steps from the position called for by the step signal so that maximum torque is provided to accelerate the stepping motor.
2. A stepping motor control system as in claim 1 wherein said encoded means includes a recording media that must be moved to provide a next step signal and means are provided for advancing said media between each passage of the step signal pulse.
3. A stepping motor control system as in claim 2 wherein there is provided another gate circuit means for delaying the position signal by means of a delay signal of sufficient duration to allow advance of said media for providing the next step signal pulse.
4. A motor control circuit for developing maximum torque from a stepping motor characerized by providing maximum torque when the mechanical position of the rotor is one step lagging the electrical condition of the motor, comprising:
   means for determining the mechanical position of the motor step by step to provide a change of position ready signal one half way between each step position;
   an "and" gate for developing a step signal;
   signal developing means having a predetermined limited sequence of characters for providing command signal pulses to said "and" gate for causing the motor to advance one step for each pulse provided; and
   circuit means for applying the ready signal to said "and" gate to thereby pass each signal command signal pulse therethrough as a step signal only when a command pulse is present, and when the motor is between one-half and one and one-half steps from the next electrical condition.
5. A motor control circuit for a stepping motor as in claim 4 wherein said ready signal is delayed for a sufficient period to allow said signal developing means to advance one character, prior to the application of the ready signal to said "and " gate.
6. A motor control circuit for a stepping motor as in claim 5 including another "and" circuit for combining a delay signal with the ready signal to thereby limit the minimum periodic spacing of the ready signals.
7. A motor control circuit as in claim 6 wherein passage of the ready signal toward said another "and" gate energizes a drive means of said signal developing means to advance it one character.

References Cited
UNITED STATES PATENTS

| | | | |
|---|---|---|---|
| 1,957,240 | 5/1934 | Young | 318—31 X |
| 2,909,769 | 10/1959 | Spaulding. | |
| 2,954,165 | 9/1960 | Myers. | |
| 3,042,847 | 7/1962 | Welch | 310—49 X |
| 3,096,467 | 7/1963 | Angus et al. | 318—138 |
| 3,098,186 | 7/1963 | Williamson et al. | 318—162 |
| 3,183,421 | 5/1965 | Herchenrueder. | |
| 3,193,744 | 7/1965 | Seward | 318—28 X |
| 3,204,165 | 8/1965 | Kreutzer | 318—138 |
| 3,217,170 | 11/1965 | Bin-Lun Ho | 318—28 |
| 3,219,895 | 11/1965 | Price. | |
| 3,281,629 | 10/1966 | Le Tilly et al. | 318—138 |

ORIS L. RADER, *Primary Examiner.*

G. SIMMONS, *Assistant Examiner.*

UNITED STATES PATENT OFFICE
CERTIFICATE OF CORRECTION

Patent No. 3,353,076　　　　　　　　　　　　　November 14, 1967

Thomas H. Haines

It is hereby certified that error appears in the above numbered patent requiring correction and that the said Letters Patent should read as corrected below.

Column 2, line 38, for "enviroments" read -- environments --; column 3, line 56, strike out "and", second occurrence.

Signed and sealed this 18th day of February 1969.

(SEAL)
Attest:

Edward M. Fletcher, Jr.
Attesting Officer

EDWARD J. BRENNER
Commissioner of Patents